United States Patent
Kamata et al.

(10) Patent No.: US 8,000,503 B2
(45) Date of Patent: Aug. 16, 2011

(54) BIOMETRICS AUTHENTICATION SYSTEM REGISTRATION METHOD, BIOMETRICS AUTHENTICATION SYSTEM, AND PROGRAM FOR SAME

(75) Inventors: Hideo Kamata, Inagi (JP); Takumi Kishino, Inagi (JP); Shinichi Eguchi, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 1083 days.

(21) Appl. No.: 11/083,296

(22) Filed: Mar. 18, 2005

(65) Prior Publication Data
US 2006/0078170 A1   Apr. 13, 2006

(30) Foreign Application Priority Data
Oct. 8, 2004   (JP) .................. 2004-296976

(51) Int. Cl.
G06K 9/00 (2006.01)
G06K 9/46 (2006.01)
G06K 7/00 (2006.01)
G06K 9/74 (2006.01)
G06B 19/00 (2006.01)

(52) U.S. Cl. ........ 382/115; 382/192; 382/199; 382/312; 340/5.52; 356/71

(58) Field of Classification Search .................. 382/115, 382/192, 199, 312; 356/71; 340/5.52
See application file for complete search history.

(56) References Cited

U.S. PATENT DOCUMENTS

| | | | | |
|---|---|---|---|---|
| 5,528,355 A * | 6/1996 | Maase et al. | ..................... | 356/71 |
| 6,314,196 B1 * | 11/2001 | Yamaguchi et al. | .......... | 382/125 |
| 7,369,686 B2 * | 5/2008 | Yokono et al. | ................ | 382/118 |
| 2001/0036297 A1 * | 11/2001 | Ikegami et al. | ............... | 382/115 |
| 2002/0048014 A1 | 4/2002 | Kono et al. | | |
| 2002/0181749 A1 * | 12/2002 | Matsumoto et al. | .......... | 382/125 |
| 2002/0196963 A1 * | 12/2002 | Bardwell | ...................... | 382/124 |
| 2004/0202353 A1 * | 10/2004 | Doi et al. | ...................... | 382/115 |

FOREIGN PATENT DOCUMENTS

JP         01263775 A     10/1989
(Continued)

OTHER PUBLICATIONS

Jain A et al.: "Biometric Template Selection: A Case Study in Fingerprints" Proc. 4th Int. Conf Audio and Video-Based Person Authentication, Jun. 9, 2003-Jun. 11, 2003 pp. 335-342.

(Continued)

Primary Examiner — Kathleen S Dulaney
(74) Attorney, Agent, or Firm — Westerman, Hattori, Daniels & Adrian, LLP

(57) ABSTRACT

A biometrics authentication system utilizes information of the palm of the hand of a body to perform individual authentication. A processing unit obtains an image of the palm of the hand of the same body a plurality of times from an image capture unit, judges the degrees of similarity among the characteristic data sets of the plurality of images of the palm of the hand, and registers a plurality of characteristic data sets with a high degree of similarity in a storage unit. And the shape of the hand in the image is checked from the outlines in the image of the palm of the hand, so it is possible to rapidly judge whether image capture has been successful and extract characteristic data, and registration processing can be executed in a short length of time.

13 Claims, 17 Drawing Sheets

FOREIGN PATENT DOCUMENTS

| | | |
|---|---|---|
| JP | 06-139336 | 5/1994 |
| JP | 2000-163574 A | 6/2000 |
| JP | 2001-273497 | 10/2001 |
| JP | 9900624-9 | 10/2002 |
| JP | 2003-256817 A | 9/2003 |
| WO | WO 2004/021884 A1 | 3/2004 |

OTHER PUBLICATIONS

European Search Report dated Jul. 7, 2007, issued in corresponding European Application No. 05252045.9.

Front page only of Japanese Office Action dated Jul. 13, 2010, issued in corresponding Japanese Patent Application No. 2004-296976.

* cited by examiner

VEIN IMAGE N1

|   | 0 | 1 | 2 | 3 | 4 |
|---|---|---|---|---|---|
| 0 | 255 | 255 | 0 | 255 | 255 |
| 1 | 255 | 255 | 0 | 0 | 0 |
| 2 | 255 | 255 | 0 | 255 | 0 |
| 3 | 0 | 0 | 255 | 0 | 0 |
| 4 | 0 | 0 | 0 | 255 | 0 |

VEIN IMAGE N2

|   | 0 | 1 | 2 | 3 | 4 |
|---|---|---|---|---|---|
| 0 | 255 | 255 | 0 | 0 | 255 |
| 1 | 255 | 255 | 255 | 0 | 0 |
| 2 | 255 | 255 | 0 | 255 | 255 |
| 3 | 0 | 0 | 255 | 255 | 0 |
| 4 | 0 | 0 | 0 | 255 | 255 |

FIG. 8

| PERSONAL ID | BIOMETRICS CHARACTERISTICS DATA |
|---|---|
| 0 0 0 1 | 0, 0, 0, 1, 1, 1, 0, 0, 0,... |
| 0 0 0 1 | 0, 0, 0, 1, 1, 1, 1, 0, 0,... |
| 0 0 0 1 | 0, 0, 1, 1, 1, 1, 0, 0, 0,... |
| 0 0 0 2 | 0, 1, 1, 1, 1, 0, 0, 0, 0,... |
| 0 0 0 2 | 0, 1, 1, 1, 1, 1, 0, 0, 0,..., |
| 0 0 0 2 | 1, 1, 1, 1, 1, 0, 0, 0, 0,... |
| ⋮ | ⋮ |
| | |
| | |

FIG. 20  PRIOR ART
REGISTERED IMAGE
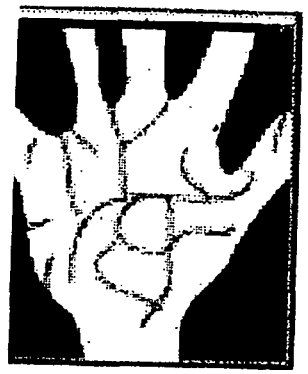
VERIFICATION IMAGE
FIG. 21  PRIOR ART
REGISTERED IMAGE
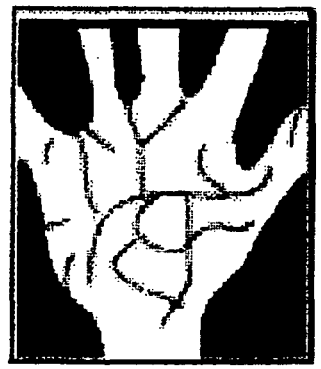
VERIFICATION IMAGE
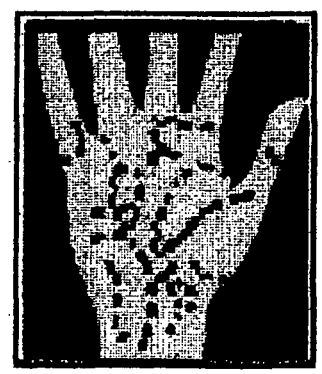

BIOMETRICS AUTHENTICATION SYSTEM REGISTRATION METHOD, BIOMETRICS AUTHENTICATION SYSTEM, AND PROGRAM FOR SAME

CROSS-REFERENCE TO RELATED APPLICATIONS

This application is based upon and claims the benefit of priority from the prior Japanese Patent Application No. 2004-296976, filed on Oct. 8, 2004, the entire contents of which are incorporated herein by reference.

BACKGROUND OF THE INVENTION

1. Field of the Invention

This invention relates to a registration method for a biometrics authentication system, a biometrics authentication system, and a program for same, which use the characteristics of a portion of the human body to perform individual authentication, and in particular relates to a registration method for a biometrics authentication system, a biometrics authentication system, and a program for same, which detect the characteristics of the palm of the hand by non-contact means to acquire biometrics information.

2. Description of the Related Art

There are numerous portions of the human body, such as fingerprints and toe-prints, the retinas of the eyes, facial features, and blood vessels, which enable discrimination of individuals. With advances in biometrics in recent years, various devices have been proposed for authentication of individuals by identifying biometrics features of such portions of the human body.

For example, blood vessels of the palm and fingers, and palm-prints and fingerprints, provide a comparatively large amount of individual characteristic data, and so are suitable for ensuring reliability in individual authentication. In particular, blood vessel (vein) patterns remain unchanged throughout life from infancy, and are regarded as being completely unique, and so are well-suited to individual authentication. FIG. 18 through FIG. 21 explain conventional palm authentication techniques. As shown in FIG. 18, at the time of registration or authentication, the user brings the palm of the hand 110 into proximity with an image capture device 100. The image capture device 100 emits near-infrared rays, which are incident on the palm of the hand 110. The image capture device 100 uses a sensor to capture near-infrared rays rebounding from the palm of the hand 110.

As shown in FIG. 19, hemoglobin in the red corpuscles flowing in the veins 112 has lost oxygen. This hemoglobin (reduced hemoglobin) absorbs near-infrared rays at wavelengths near 760 nanometers. Consequently when near-infrared rays are made incident on the palm of a hand, reflection is reduced only in the areas in which there are veins, and the intensity of the reflected near-infrared rays can be used to identify the positions of veins.

As shown in FIG. 18, the user first uses the image capture device 100 of FIG. 18 to register vein image data of the palm of his own hand in a server or on a card. Then, in order to perform individual authentication, the user employs the image capture device 100 of FIG. 18 to read the vein image data of his own hand.

The individual is authenticated by comparing the patterns of veins in the registered vein image retrieved using the user's ID and in the vein verification image thus read. For example, on comparing the vein patterns in the registered image and a verification image as in FIG. 20, the individual is authenticated as the individual in question. On the other hand, upon comparison of the vein patterns in a registered image and in a verification image as in FIG. 21, the individual is not authenticated (see for example Japanese Patent Laid-open No. 2004-062826).

In such non-contact detection of biometrics information, the body part can be freely moved with respect to the image capture device 100, and in particular the hand can be freely moved. On the other hand, in order to perform accurate detection, the body part for detection 110 must be positioned within the image capture range of the image capture device 100. Methods to achieve this have been proposed in which the position and orientation of the hand is detected from a captured image, and when accurate image capture is not possible, a display or voice output is employed to convey the inappropriateness of the position or orientation of the hand (see for example WO04/021884). In this proposed method, an image of the entire hand is captured and is compared with the average registered hand shape to detect the position and orientation of the hand.

In registration of such biometrics information, methods have been proposed in which, when registering fingerprint data, fingerprint data is detected a plurality of times and common characteristic data is extracted from the plurality of sets of fingerprint data, and this common characteristic data is registered (see for example Japanese Patent Laid-open No. 01-263775 and Japanese Patent Laid-open No. 11-232459). Through such methods, the effect on registered data of detection noise and of changes in fingerprint shape due to differences in finger pressure can be prevented.

In such non-contact detection of biometrics information, detection is by non-contact means, and moreover the body part, and in particular the hand, can move freely. On the other hand, in order to perform rapid biometrics authentication, it is necessary that image capture be performed frequently, and that appropriate images be detected and output to the registration/authentication process. Hence in methods which compare the images of entire hands, time is required to detect the position and orientation of the hand, and moreover the size of the sensor in the image capture device is increased, making such methods unsuitable when rapid detection or small equipment sizes are demanded.

Further, in conventional methods in which common characteristics are extracted and registered, noise due to the biometrics detection device and differences in detection states at the time of biometrics detection can be excluded. But when registering common data, there is the possibility that the individual biometrics characteristic data sets actually obtained will not exactly match the registered data, and that the amount of characteristic data will differ from the amount of characteristic detection data. Hence when comparing verification data with registered data at the time of authentication, it may be difficult to perform verification with high accuracy.

Moreover, because the actual data is biometrics data, changes in physical condition must also be taken into account. And when registering common data, if there are differences in physical condition at the time of authentication and at the time of registration, even when the individual is the same, authentication as the same individual may not be possible, so that problems may occur. For example, in authentication using vein patterns, there are numerous factors resulting in fluctuations, among them the pulse rate, the timing of image capture, and the manner in which the hand is presented.

Hence there are impediments to application to equipment in general for use at any time, anywhere, by anyone. But if verification rates are not satisfactory, and problems arise for biometrics reasons, widespread adoption by both users and by equipment manufacturers is impeded.

SUMMARY OF THE INVENTION

Hence an object of this invention is to provide a registration method for a biometrics authentication system, biometrics authentication system, and program for same to rapidly extract characteristic data even when using non-contact image capture of the palm of the hand.

Another object of the invention is to provide a registration method for a biometrics authentication system, biometrics authentication system, and program for same to obtain accurate characteristic data, even when the non-contact image capture device is reduced in size.

Still another object of the invention is to provide a registration method for a biometrics authentication system, biometrics authentication system, and program for same to effectively utilize a plurality of sets of characteristic data obtained by image capture by a non-contact image capture device, to improve verification accuracy.

Still another object of the invention is to provide a registration method for a biometrics authentication system, biometrics authentication system, and program for same to prevent reductions in verification accuracy, even when there are changes in the non-contact image capture device, changes in physical condition, and changes in the detection state.

In order to attain these objects, a biometrics authentication system of this invention detects characteristic data of the palm of a body, registers the data for future use, detects characteristic data of the palm of the body, verifies the characteristics data against the previously registered characteristic data, and performs individual authentication. This system has an image capture unit which captures images of a palm of the body; a storage unit which stores characteristic data of the palm of the body which has been registered; and a processing unit which extracts outlines from images of the palm of which has been captured by the image capture unit, judges from the extracted outlines whether the image capture has been successful, extracts the characteristic data from images of palms judged to be successful, and registers the characteristic data in the storage unit. The processing unit obtains a plurality of images of the palm of the same body from the image capture unit, judges the mutual degree of similarity among the characteristic data for each of the plurality of images of the palm, and registers in the storage unit a plurality of characteristic data sets with high degree of similarity.

Further, a registration method for a biometrics authentication system of this invention is a registration method in a biometrics authentication system which detect characteristic data of the palm of the hand of a body and register for future use, detect characteristic data of the palm of the hand of the body and verify against the registered characteristic data, to authenticate the individual. The registration method has a step of obtaining an image of the hand of the body from an image capture unit which captures images of the palm of the hand; a step of extracting the outlines of the image of the palm of the hand and of judging from the outlines whether the image capture has been successful; a step of extracting characteristic data from a successfully captured image of the palm of the hand; a step of judging the mutual degree of similarity of a plurality of characteristic data sets for a plurality of captured images; and a step of registering a plurality of characteristic data sets with a high degree of similarity in a storage unit.

Further, a program of this invention causes a computer to execute a step of obtaining an image of the hand of the body from an image capture unit which captures images of the palm of the hand; a step of extracting the outlines of the image of the palm of the hand and of judging from the outlines whether the image capture has been successful; a step of extracting characteristic data from a successfully captured image of the palm of the hand; a step of judging the mutual degree of similarity of a plurality of characteristic data sets for a plurality of captured images; and a step of registering a plurality of characteristic data sets with a high degree of similarity in a storage unit.

In this invention, it is preferable that the processing unit judge the degree of similarity of the second and subsequent characteristic data sets for the palm of the hand with reference to the first characteristic data set of the palm of the hand.

In this invention, it is preferable that the processing unit capture images of the palm of the hand of the same body using the image capture unit until a prescribed number of characteristic data sets with a high degree of similarity are obtained.

In this invention, it is preferable that after registering the plurality of characteristic data sets with a high degree of similarity in the storage unit, the processing unit acquire an image of the palm of the hand from the image capture unit, extract the characteristic data, verify this data against the plurality of characteristic data sets registered in the storage unit, and perform trial authentication.

In this invention, it is preferable that the processing unit extract the outlines from an image of the palm of the hand captured by the image capture unit, judge the image capture to be successful from the extracted outlines, extract the characteristic data from an image of the palm of the hand judged to be successful, and verify the characteristic data against the plurality of characteristic data sets registered in the storage unit, to perform individual authentication.

In this invention, it is preferable that when the degree of similarity is equal to or greater than a prescribed threshold, the processing unit judge the degree of similarity to be high.

In this invention, it is preferable that the processing unit register the first set of biometrics characteristic data, and in addition, for n sets of biometrics characteristic data, calculate all the degrees of similarity of the first through the (n−1)th biometrics characteristic data sets, and when all degrees of similarity are equal to or greater than a threshold, register the n sets of biometrics characteristic data in the storage unit.

In this invention, it is preferable that at the time of individual authentication, the processing unit reads the plurality of biometrics characteristic data sets from the storage unit in response to identification information for the individual, and verify the characteristic data obtained from an image of the palm of the hand from the image capture unit against the plurality of characteristic data sets thus read.

In this invention, it is preferable that the processing unit detect the fact that the extracted characteristic data is similar to one of the plurality of registered characteristic data sets, and perform individual authentication.

In this invention, it is preferable that the processing unit judge whether the image capture has been successful from the positional relation of the outlines of the image of the palm of the hand and the image capture range of the image capture device.

In this invention, it is preferable that the processing unit capture an image of a portion of the hand including the palm of the hand and a portion of the fingers of the body.

In this invention, it is preferable that the processing unit judge whether the image capture has been successful from the number of outlines of the image of the palm of the hand within the image capture range.

In this invention, it is preferable that the processing unit judge whether the image capture has been successful from the positional relationship between the outlines of the image of the palm of the hand and the image capture range of the image capture device, and from the number of outlines within the image capture range.

In this invention, it is preferable that, when the image capture is judged not to be successful from the outline of the image of the palm of the hand, the processing unit cause image capture of the palm of the hand to again be performed by the image capture unit, to acquire an image of the palm of the hand.

In this invention, it is preferable that the image capture unit have a distance sensor to judge the distance between the image capture unit and the palm of the hand, and that when the distance measured by the distance sensor is within a prescribed range, that the processing unit capture an image of the palm of the hand from the image capture unit, and modify the prescribed range at the time of registration and at the time of individual authentication.

In this invention, images of the palm of a hand of the same body are obtained a plurality of times from the image capture unit, the mutual degree of similarity among characteristic data sets of a plurality of images of the palm of the hand is judged, and a plurality of characteristic data sets with a high degree of similarity are registered in a storage unit. So even when characteristic data detected a plurality of times is used, verification can be performed which accommodates changes in biometrics state, without lowering verification accuracy, and moreover inconvenience to the user can be prevented, contributing to the widespread adoption of the biometrics authentication system. Because the shape of the hand in images is checked using outlines of the palm of the hand in the image, it is possible to rapidly judge whether an image capture has been successful and extract characteristic data, and even using such a method, registration processing can be executed in a short length of time.

BRIEF DESCRIPTION OF THE DRAWINGS

FIG. 8 explains data registered in the storage portion in FIG. 3;

FIG. 20 explains conventional palm image capture technology; and,

FIG. 21 explains conventional palm image capture technology.

DESCRIPTION OF THE PREFERRED EMBODIMENTS

Below, embodiments of the invention are explained, in the order of a biometrics authentication system, biometrics data registration processing method, distance/hand outline detection processing, biometrics characteristic data registration processing method, trial authentication and authentication processing, and other embodiments.

Biometrics Authentication System

Figure 1:
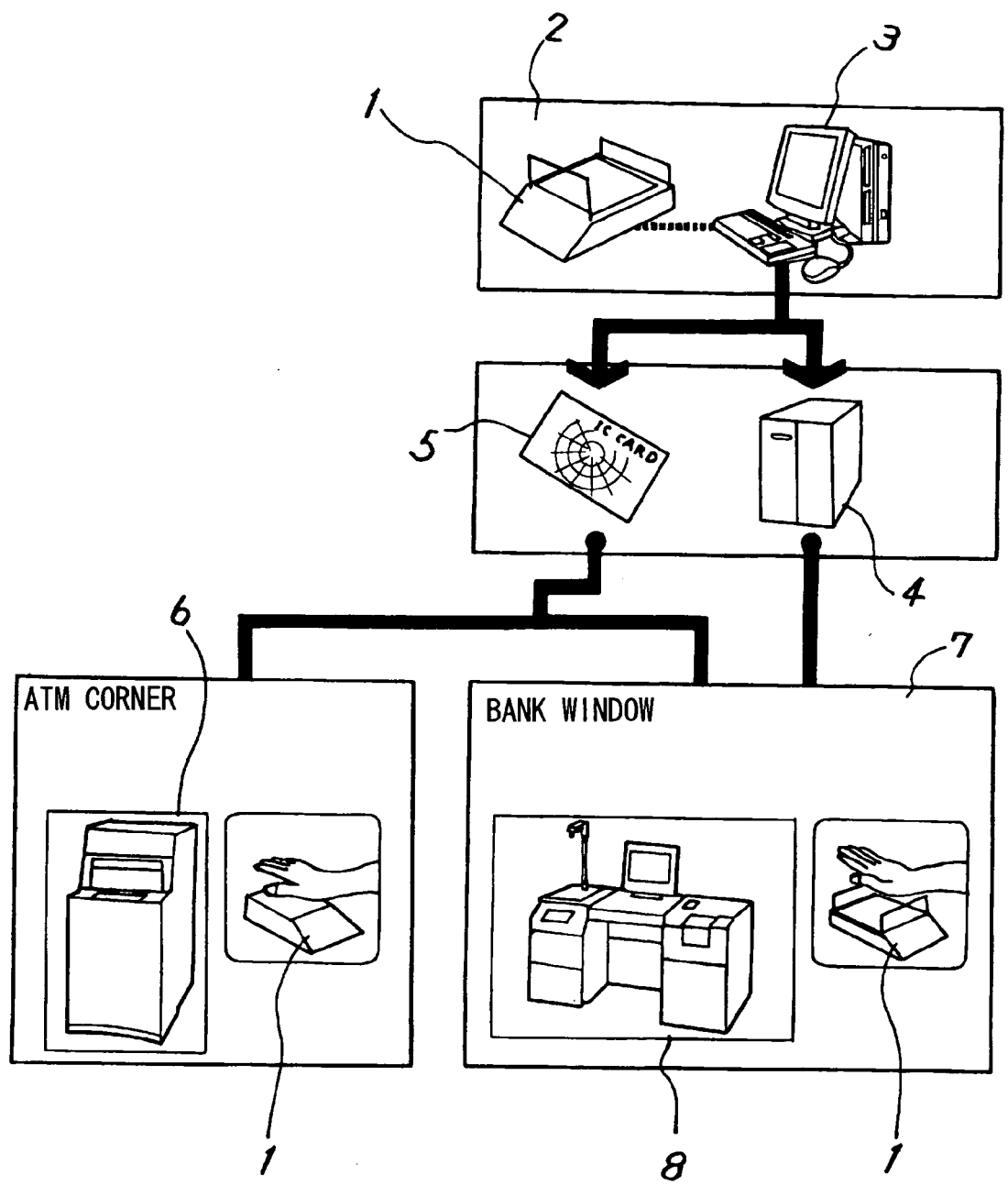
FIG. 1 shows the configuration of a biometrics authentication system of one embodiment of the invention.
Figure 2:
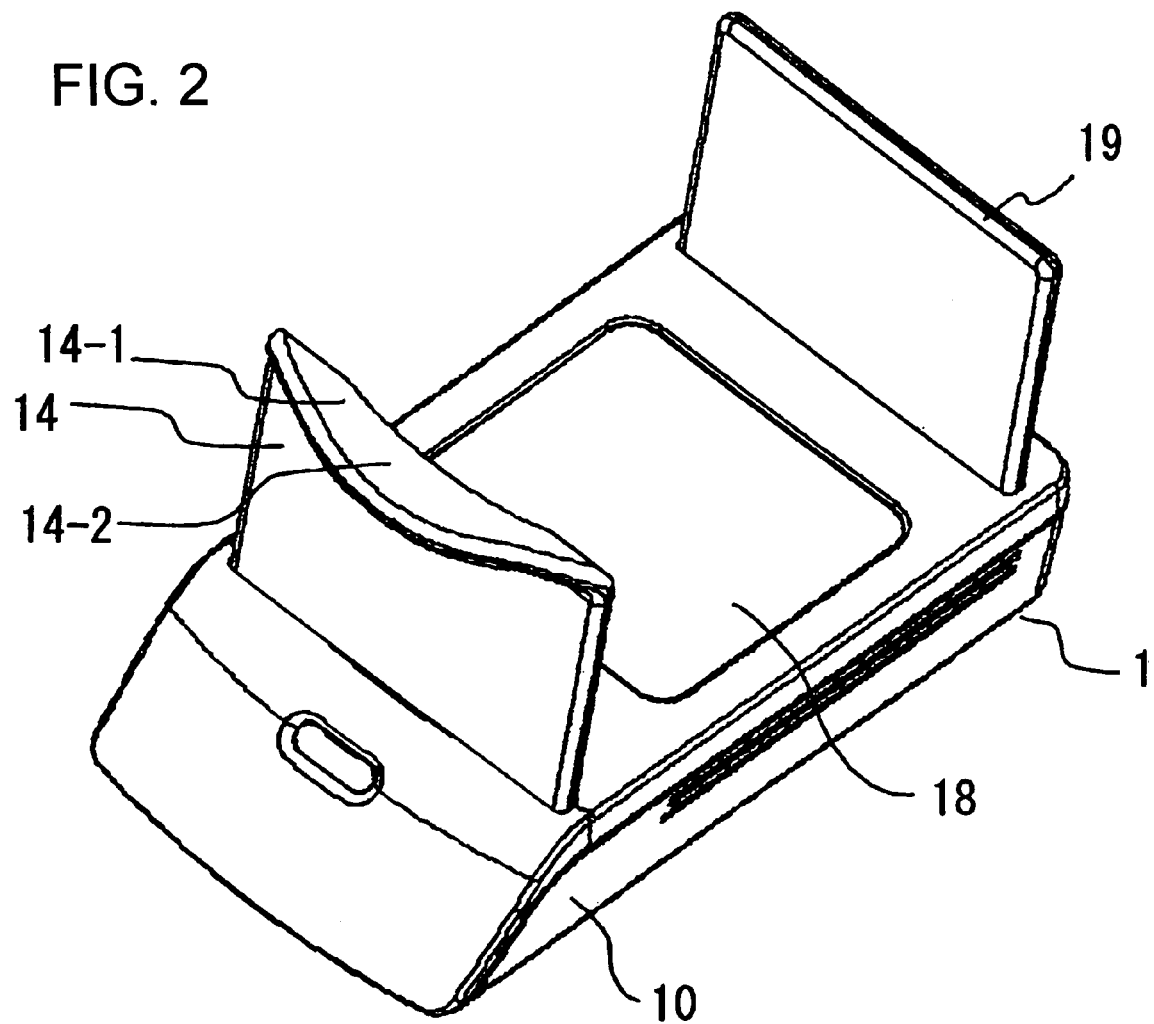
FIG. 2 is an external view of the palm image capture device of FIG. 1.

FIG. 1 shows the configuration of a biometrics authentication system of one embodiment of the invention; FIG. 2 is an external view of the palm image capture device of FIG. 1; and FIG. 3 explains the biometrics authentication processing of FIG. 1.

Figure 3:
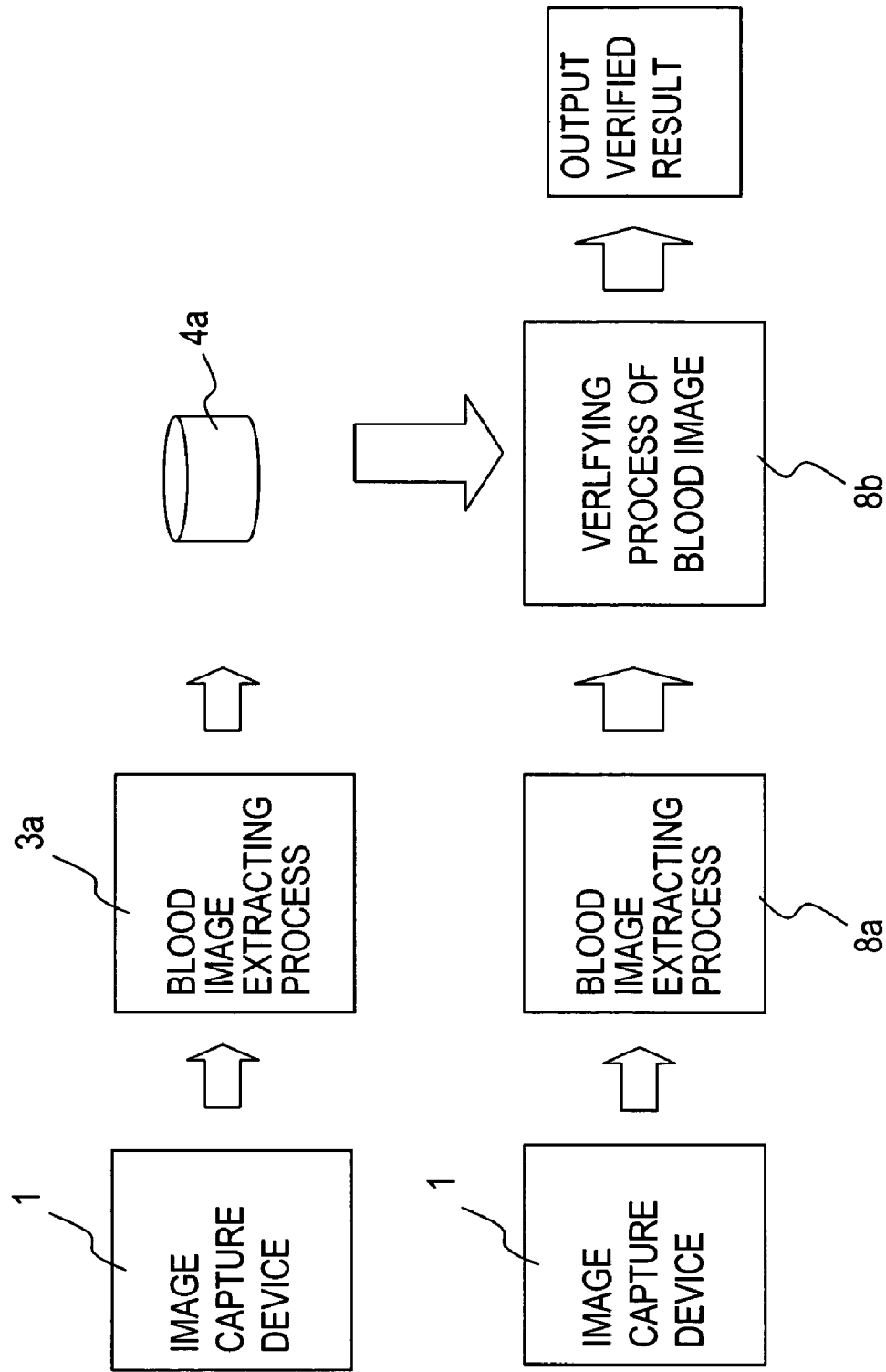
FIG. 3 is a functional block diagram of the biometrics authentication processing of FIG. 1.

As a biometrics authentication system, FIG. 1 shows an example of a palm vein authentication system in a financial institution. A palm image capture device 1 as explained in FIG. 2, and a branch office terminal (for example, a personal computer) 3 connected to the image capture device 1, are provided in the service area 2 of the financial institution. A user requesting vein pattern authentication places his hand over the palm image capture device (hereafter the "image capture device") 1. As shown in FIG. 3, the image capture device 1 reads the palm, and the blood vessel image extraction processing 3a of the terminal 3 extracts the vein pattern, and registers this as vein data in the terminal 3.

This vein data is recorded in a storage portion 4a of a database server 4 connected to the terminal 3, or in an individual card (for example, an IC card) 5 carried by the user. The server 4 is connected to the service area terminal 8 in the service area 7 of the financial institution, and the service area terminal 8 is connected to the image capture device 1.

In order to make a withdrawal or perform some other financial transaction in the service area 7 of the financial institution, the user places his hand over the image capture device 1 provided in the service area 7. As shown in FIG. 3, the image capture device 1 reads the palm of the hand, and the vein pattern thereof is extracted through blood vessel image extraction processing 8a by the service area terminal 8. Through verification processing 8b, the service area terminal 8 verifies the vein pattern, as vein data, against the vein data registered in the database server 4 to authenticate the individual.

The server 4 is connected to an ATM (Automated Teller Machine) 6 of the financial institution, and the ATM 6 can be used to perform transactions through vein pattern authentication. In order for a user to use the ATM 6 to make a withdrawal or perform some other financial transaction, he places his hand over the image capture device 1-1 provided in the ATM 6. The image capture device 1-1 reads the palm. Similarly to the service area terminal 8, the ATM 6 extracts the vein pattern (blood vessel image), and verifies this pattern, as vein data, against the vein data registered in an IC card 5 carried by the user or in the database server 4, to authenticate the individual.

As shown in FIG. 2, the palm image capture device 1 of FIG. 1 is equipped with a sensor unit 18 substantially in the center of the main unit 10. On the forward portion (on the user side) of the sensor unit 18 is provided a front guide 14. The front guide 14 comprises a sheet of synthetic resin, transparent or substantially transparent.

The front guide 14 serves the purposes of guiding the hand of the user in the front and of supporting the wrist. Hence the front guide 14 provides guidance to the user so as to guide the wrist over the sensor unit 18 and supports the wrist. As a result, the attitude of the palm of the hand, that is, the position, inclination, and size over the sensor unit 18 can be controlled.

The cross-sectional shape of the front guide 14 has a vertical body and, in the top portion, a horizontal portion 14-1 to support the wrist. A depression 14-2 is formed continuously in the center of the horizontal portion 14-1, to facilitate positioning of the wrist.

Figure 4:
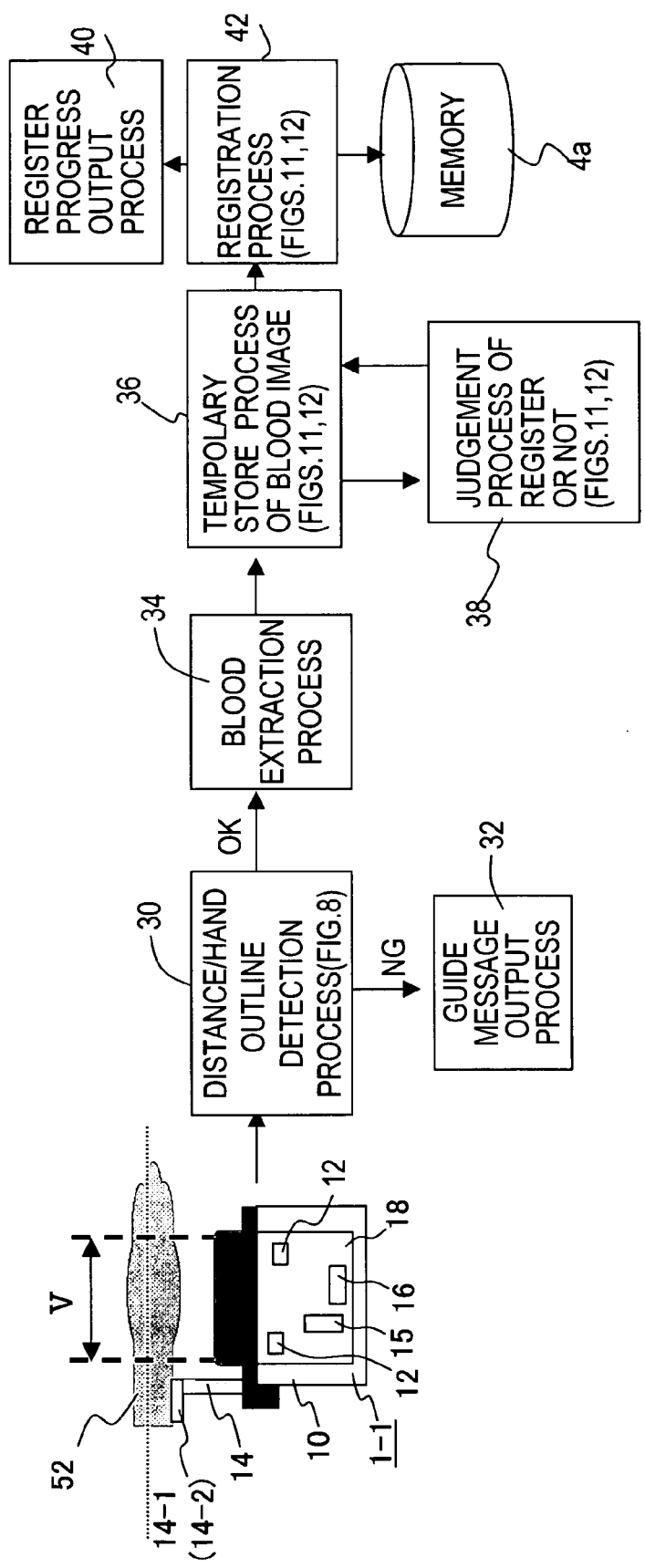
FIG. 4 is a functional block diagram of the biometrics information registration processing of FIG. 3.

As indicated in FIG. 4 below, the sensor unit 18 is provided with an infrared sensor (CMOS sensor) and focusing lens 16 and a distance sensor 15 in the center; on the periphery thereof are provided a plurality of near-infrared light emission elements (LEDs) 12. For example, near-infrared light emission elements 12 are provided at eight places on the periphery, to emit near-infrared rays upwards.

The readable region V of this sensor unit 18 is regulated by the relation between the sensor, focusing lens, and near-infrared light emission region. Hence the position and height of the front guide 14 are set such that the supported wrist is positioned in the readable region V.

Biometrics Data Registration Processing

Figure 5:
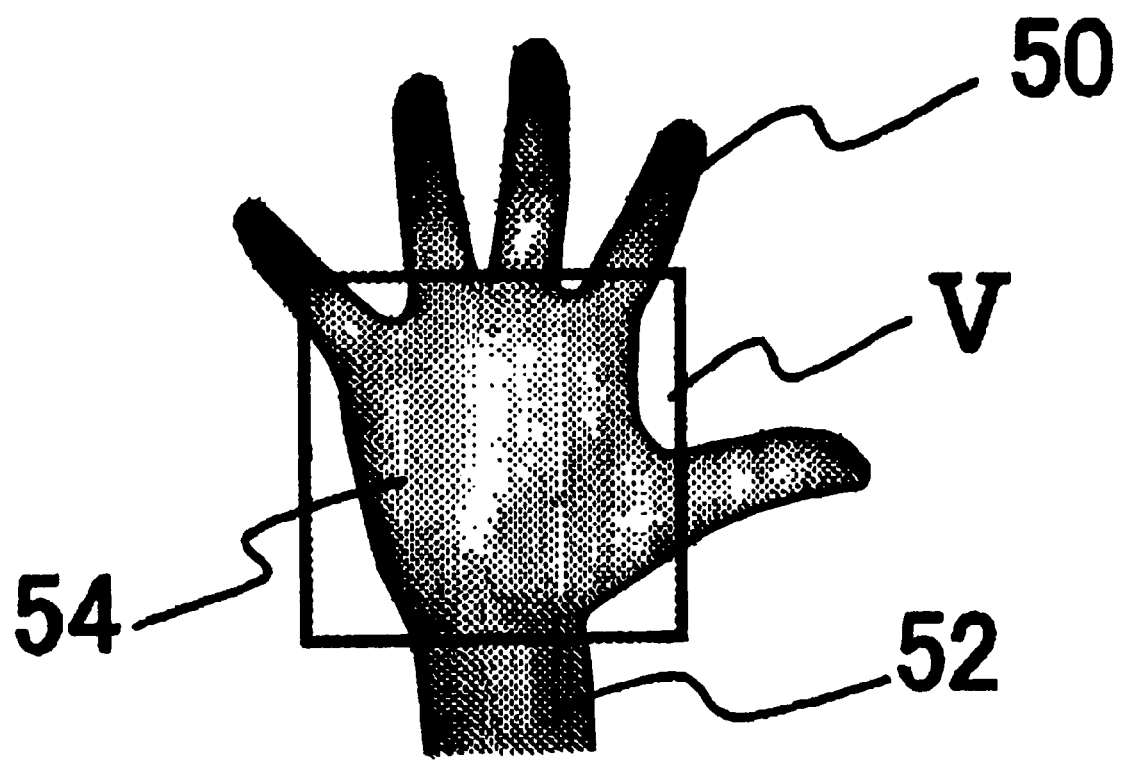
FIG. 5 explains the range of image capture of the palm image capture device of FIG. 2.
Figures 6, 7:
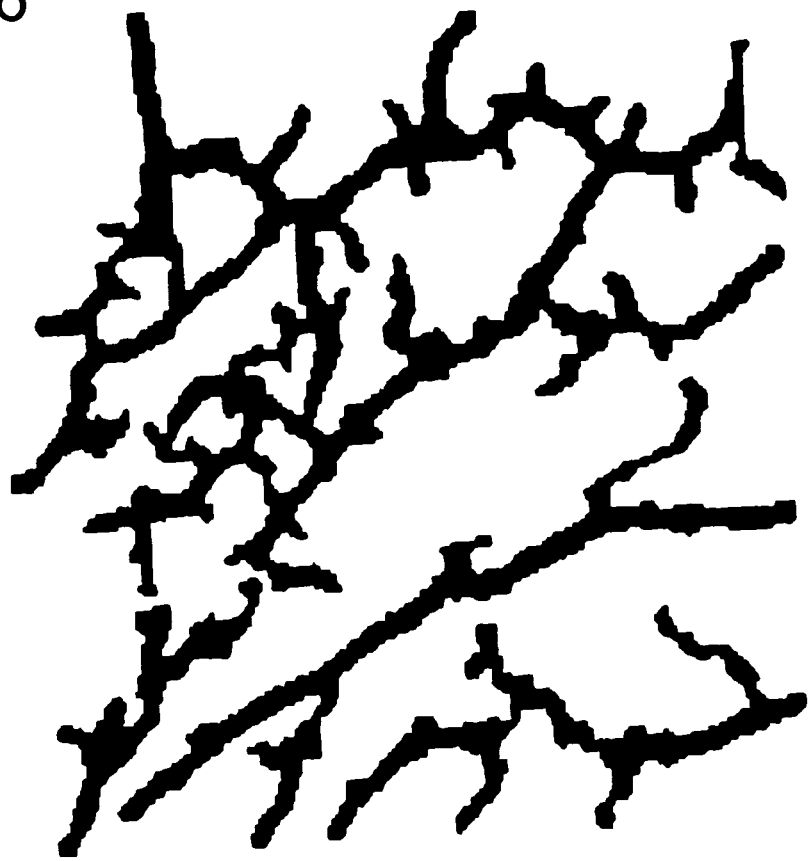
FIG. 6 explains the blood vessel image of FIG. 4.
FIG. 7 explains the blood vessel image data of FIG. 6.

FIG. 4 is a block diagram of the biometrics information registration processing of an embodiment of the invention, FIG. 5 explains the relation between the range of image capture of the image capture device and the palm of the hand, FIG. 6 explains the blood vessel image detected in FIG. 4, FIG. 7 explains the biometrics characteristic data of FIG. 4, and FIG. 8 explains registered data.

As shown in FIG. 4, the palm image capture device 1 of FIG. 2 is equipped with a sensor unit 18 substantially in the center of the main unit 10. A front guide 14 is provided on the forward portion (toward the user) of the sensor unit 18. The front guide 14 comprises a sheet of synthetic resin, transparent or substantially transparent.

The front guide 14 serves the purposes of guiding the hand of the user in the front and of supporting the wrist. Hence the front guide 14 provides guidance to the user so as to guide the wrist over the sensor unit 18 and supports the wrist. As a result, the attitude of the palm of the hand, that is, the position, inclination, and size over the sensor unit 18 can be controlled.

On the other hand, the sensor unit 18 is provided with an infrared sensor (CMOS sensor) and focusing lens 16 and a distance sensor 15 in the center; on the periphery thereof are provided a plurality of near-infrared light emission elements (LEDs) 12. For example, near-infrared light emission elements 12 are provided at eight places on the periphery, to emit near-infrared rays upwards.

The readable region V of this sensor unit 18 is regulated by the relation between the sensor, focusing lens, and near-infrared light emission region. Hence the position and height of the front guide 14 are set such that the supported wrist is positioned in the readable region V.

As shown in FIG. 5, when the hand 50 is extended with palm flat, the palm has maximum area, and moreover is flat, so that when the palm is subjected to image capture in the image capture region V of the sensor unit 18, an accurate vein pattern which can be used in registration and verification is obtained. As shown in FIG. 6, when the distance from the sensor unit 18 to the palm is within a prescribed range, a sharp, focused blood vessel image is obtained by the sensor 16 of the sensor unit 18.

Hence as shown in FIG. 4, by having the front guide 14 support the wrist 52 above the sensor unit 18, the position, inclination and height of the palm above the sensor unit 18 are made precise with respect to the image capture range of the sensor unit 18, and the user's hand can be guided and supported.

Returning to FIG. 4, the terminal 3 connected to the image capture device 1 executes a series of registration processing 30 to 42. The control portion of the terminal 3 has, for example, a CPU, various types of memory, interface circuitry, and other circuits necessary for data processing. The CPU executes the series of registration processing 30 to 42.

Distance/hand outline detection processing 30 receives the distance from the image capture device 1 measured by the distance sensor 15, judges whether the palm or other object is at a distance within a prescribed range from the sensor unit 18. And moreover the outline detection processing 30 detects the outline of the hand from the image captured by the sensor unit 18, and based on the outline, judges whether the image can be used in registration and verification processing. For example, a judgment is made as to whether the palm appears sufficiently in the image. This processing is described below using FIG. 9.

As explained in FIG. 9 below, guidance message output processing 32 outputs to the display of the terminal 3 a message guiding the palm to the left or right, forward or backward, upward or downward, when the distance measured by the distance sensor 15 indicates that the hand is outside the image capture range, and when the image cannot be used in registration and verification processing. By this means, the hand of the user is guided into position over the image capture device 1.

Figure 18:
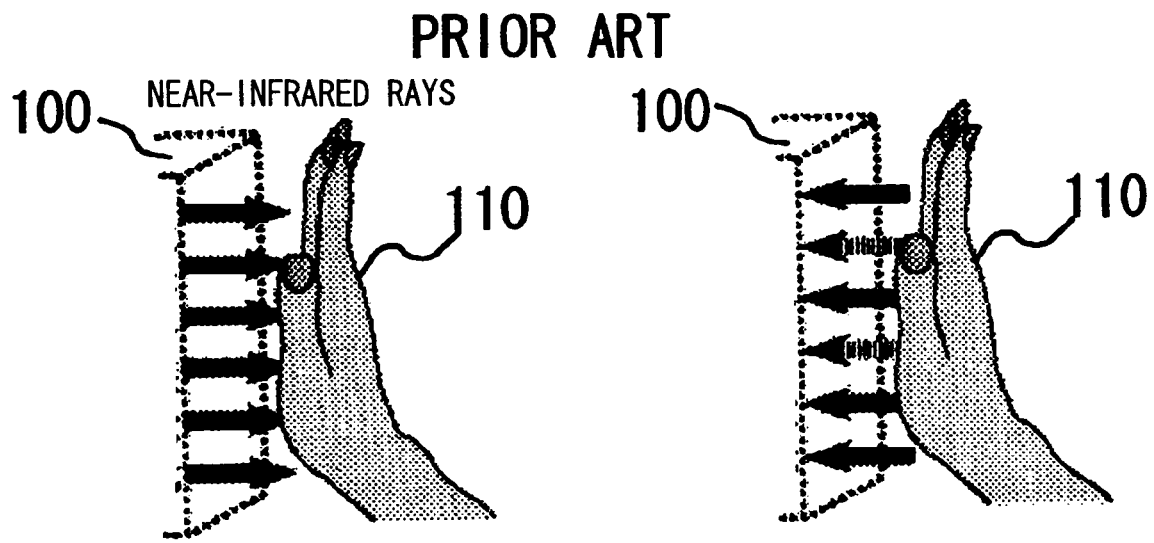
FIG. 18 explains a conventional palm image capture device.

Blood vessel image extraction processing 34 extracts a vein image from the image of the hand when hand outline detection processing 30 judges that an image has been captured with the hand held correctly. That is, as explained using FIG. 18 and FIG. 20, grayscale data of the image of the palm such as that of FIG. 7 is obtained through differences in reflectivity. The vein pattern image is an image like that shown in FIG. 6; the data is grayscale data such as that in FIG. 7.

Blood vessel image temporary holding processing 36 temporarily holds the extracted blood vessel image data. Register-ability judgment processing 38 judges the degree of similarity of a plurality of blood vessel image data sets, in order to register a plurality of optimal blood vessel image data sets from among the plurality of blood vessel image data sets held by the blood vessel image temporary holding processing 36, and judges register-ability. Registration processing 42 registers blood vessel image data judged to be registered in a storage portion 4a. Registration progress output processing 40 outputs the state of progress of registration processing 42 to the display of the terminal device 3.

Thus for each image captured, exactly the same biometrics characteristic data is not necessarily obtained, and there are differences according to the image capture device, physical condition, the manner of extension of the hand, and other aspects of the state of image capture. Hence image capture is performed a plurality of times, and only optimal information suitable for registration is registered. However, if the person performing registration (the user) were obligated to perform dozens of registration operations, the burden on the user would be severe. Consequently the number of operations is limited to the number likely to be acceptable to users, and the optimal registration information is obtained from this information and is registered in the storage portion 4a. For example, as shown in FIG. 8, three biometrics characteristic data sets (blood vessel image data for the palm of the hand) are registered for each individual ID.

Distance/Hand Outline Detection Processing

Figure 9:
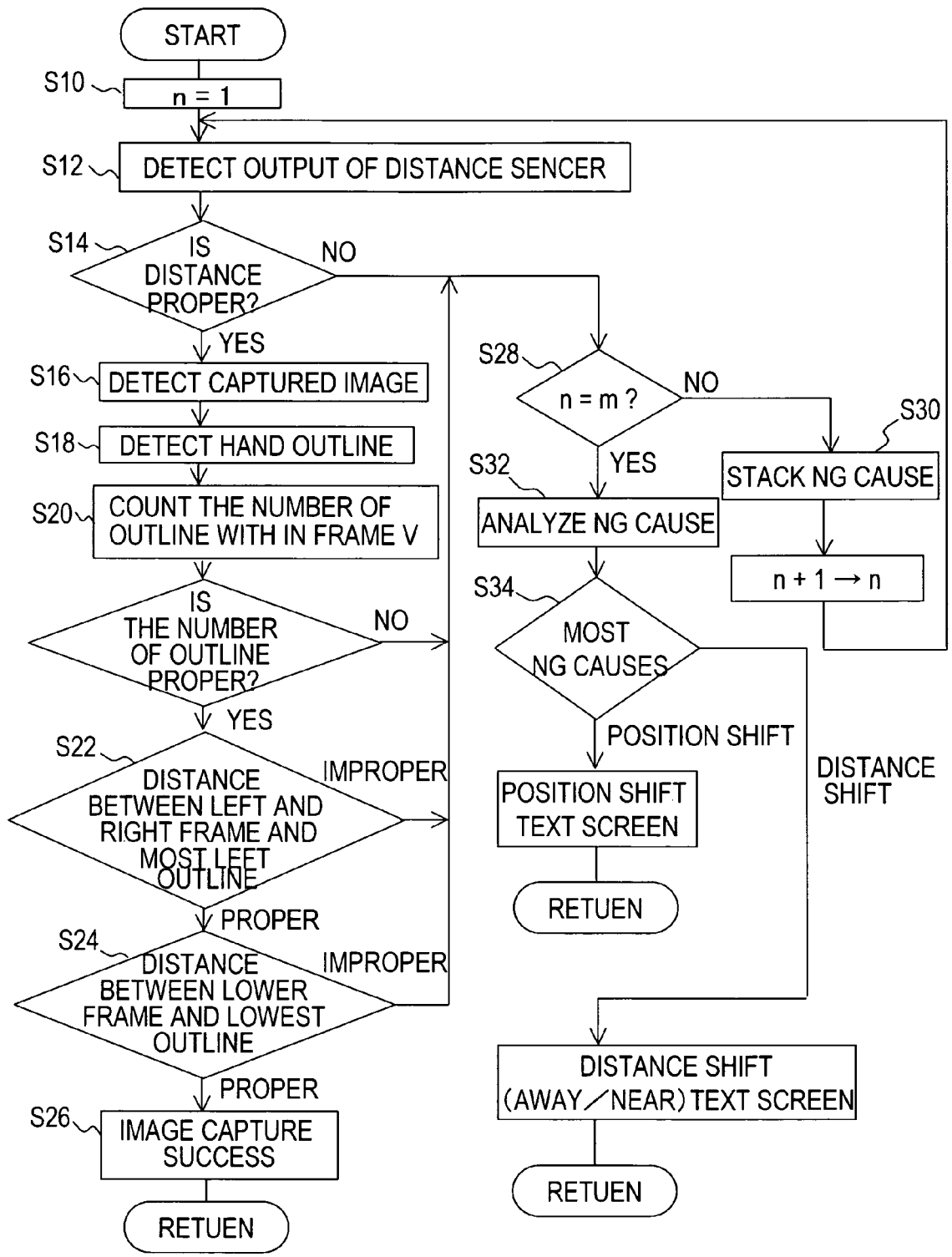
FIG. 9 shows the flow of distance/hand outline detection processing in FIG. 3.
Figure 10:
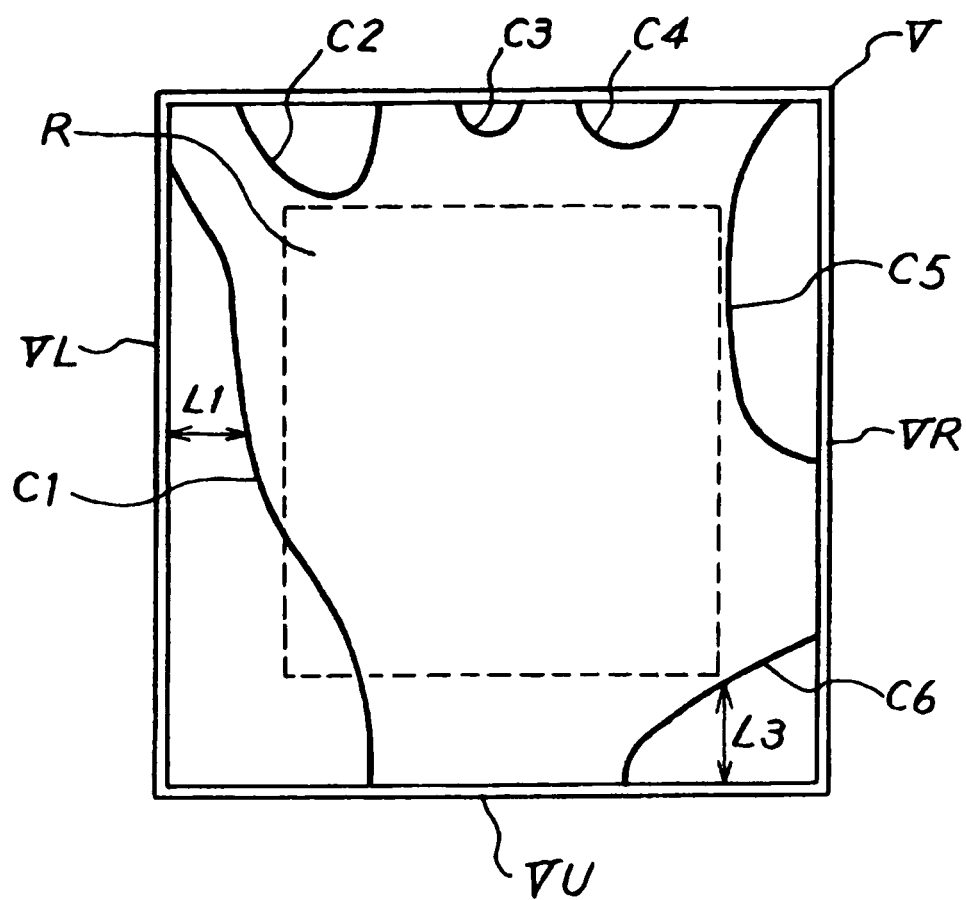
FIG. 10 explains hand outline processing in FIG. 9.

FIG. 9 shows the flow of distance/hand outline detection processing in FIG. 4, and FIG. 10 explains processing to judge the appropriateness of captured images through hand outlines.

(S10) The images captured counter value 'n' is initialized to "1".

(S12) The distance sensor 15 is caused to measure the distance to the palm of the hand, and the output is detected.

(S14) The detected distance and the focal length determined by the sensor and the lens 16 of the sensor unit 18 are compared, and a judgment is made as to whether the distance to the palm is within the appropriate range. The appropriate range may for example employ a narrow margin during registration, with the distance from the sensor unit 18 set to between 50 and 60 mm, whereas during verification, described below, the margin may be made greater, with the distance from the sensor between 40 and 70 mm. By this means, the speed of verification processing can be improved while maintaining the accuracy of registration data.

(S16) If the distance is appropriate, near-infrared light is emitted from the image capture device 1, and the reflected light is received by the sensor 16, to obtain an image of the palm of the hand.

(S18) The outline of the palm of the hand is detected from the image captured by the image capture device 1. As shown in FIG. 5, in order to obtain a blood vessel image of the palm, the image capture range for the hand 50 is limited to V. The image capture range V is set to the range in which an image of the palm of the hand, a portion of the wrist, and the bases of the five fingers is captured. By this means, the sensor unit 18 can be made smaller. When an image is captured with the hand opened and in the correct position as in FIG. 5, there are six outlines within the image capture range V, which are C1 (the left edge of the hand); C2 (between fingers); C3 (between fingers); C4 (between fingers); C5 (between fingers); and C6 (the right edge of the hand, leading to the wrist), as shown in FIG. 10.

(S20) Next, in order to judge whether the image is useable in verification processing based on the outlines, first the number of outlines within the image capture range (frame) V is counted. A judgment is then made as to whether the number of outlines counted is appropriate. As explained above, when fingers are spread and the wrist is present, the number of outlines detected is "6", and judgment is appropriate. On the other hand, if the number of outlines detected is "5" or fewer, either fingers are not spread or the position of the palm is shifted, or fingers of the hand cannot be detected. This image is regarded as inappropriate, and processing proceeds to step S28.

(S22) If the number of outlines is appropriate, then the distances between the outlines and the image frame V are calculated, and from the distances, a judgment is made as to whether there is right-left or forward-backward shifting. As shown in FIG. 10, the distance L1 between the left edge VL of the frame and the leftmost position of the outline C1 is calculated, and judgments made as to whether the calculated distance is within a prescribed distance range, and whether there is left-right shifting; if there is shifting, processing proceeds to step S28.

(S24) Next, as shown in FIG. 10, the distance L3 from the bottom edge VU of the frame and the lowermost position of the outline C6 is calculated, and judgments are made as to whether the calculated distance is within a prescribed distance range, and whether there is forward-backward shifting; if there is shifting, processing proceeds to step S28.

(S26) If there is no shifting forward, because the fingers are spread, the wrist is present, and there is no shifting of positions in the captured image, the image capture is judged to be successful, and the image is provided for registration processing 34-38. Processing then returns. In the registration processing, the image within the dashed-line frame R in FIG. 10 is picked up, and the blood vessel image detection explained in FIG. 4 is performed.

(S28) If on the other hand in step S14 the distance is not appropriate, when in steps S20 to S24 the fingers are not spread or a shift in position is detected, a judgment is made as to whether the images captured counter value 'n' has reached a predetermined number 'm' (for example, 10 times).

(S30) If the images captured counter value 'n' has not reached the predetermined number 'm' (for example, 10 times), the image capture NG cause (fingers insufficiently spread, left-right/forward-backward shift, distance shift) is stacked and held. The images captured counter value 'n' is then changed to "n+1", and processing returns to step S12.

(S32) If on the other hand the images captured counter value 'n' has reached the predetermined number 'm' (for example, 10 times), it is judged that the relation between the palm and the sensor must be modified. Hence the predetermined number m (for example, 10) of stacked image capture NG causes are analyzed. For example, causes are classified into insufficient finger spreading, position shifts (left-right/forward-backward), and distance shifts, and each is counted.

(S34) The counted values are used to detect the most frequent image capture NG cause. When insufficient finger spreading and position shifts are the most frequent cause, a guidance screen with text for finger spreading and position shift is selected, and processing returns. When distance shifts are the most frequent cause, a guidance screen with text for distance shifts is selected, and processing returns.

In this way, the image capture range is limited, outlines in a captured image are extracted, and the outlines are used to judge whether the shape of the hand in the captured image is appropriate, so that compared with conventional methods in which an image of the entire hand is captured and is compared with a basic registration pattern, appropriate palm images can be obtained much more quickly. Also, the sensor unit size can be decreased.

When image capture (including distance measurement) is performed a plurality of times in short intervals, and image capture NG occurs frequently, these are stacked for future use, and if after a prescribed number of image captures the image capture NG has not yet been resolved, it is judged that the relation between the palm and sensor must be corrected. The predetermined number m (for example, 10) of stacked image capture NG causes are then analyzed, and screen guidance for the manner of extension of the hand is provided according to the analysis results.

Hence the guidance screen does not change frequently, and so the user can fully understand the cause of the problem and can change the manner of extension of his hand. As a result, confusion on the part of the user is prevented, the hand can be moved quickly to an appropriate position and distance, and the speed of authentication can be increased.

Further, the most frequently occurring image capture NG is selected, and the user is notified of the cause by a screen, so that occasional image capture NG causes due to the user can be excluded, and user guidance can be executed more reliably.

Biometrics Characteristic Data Registration Processing Method

Figure 11:
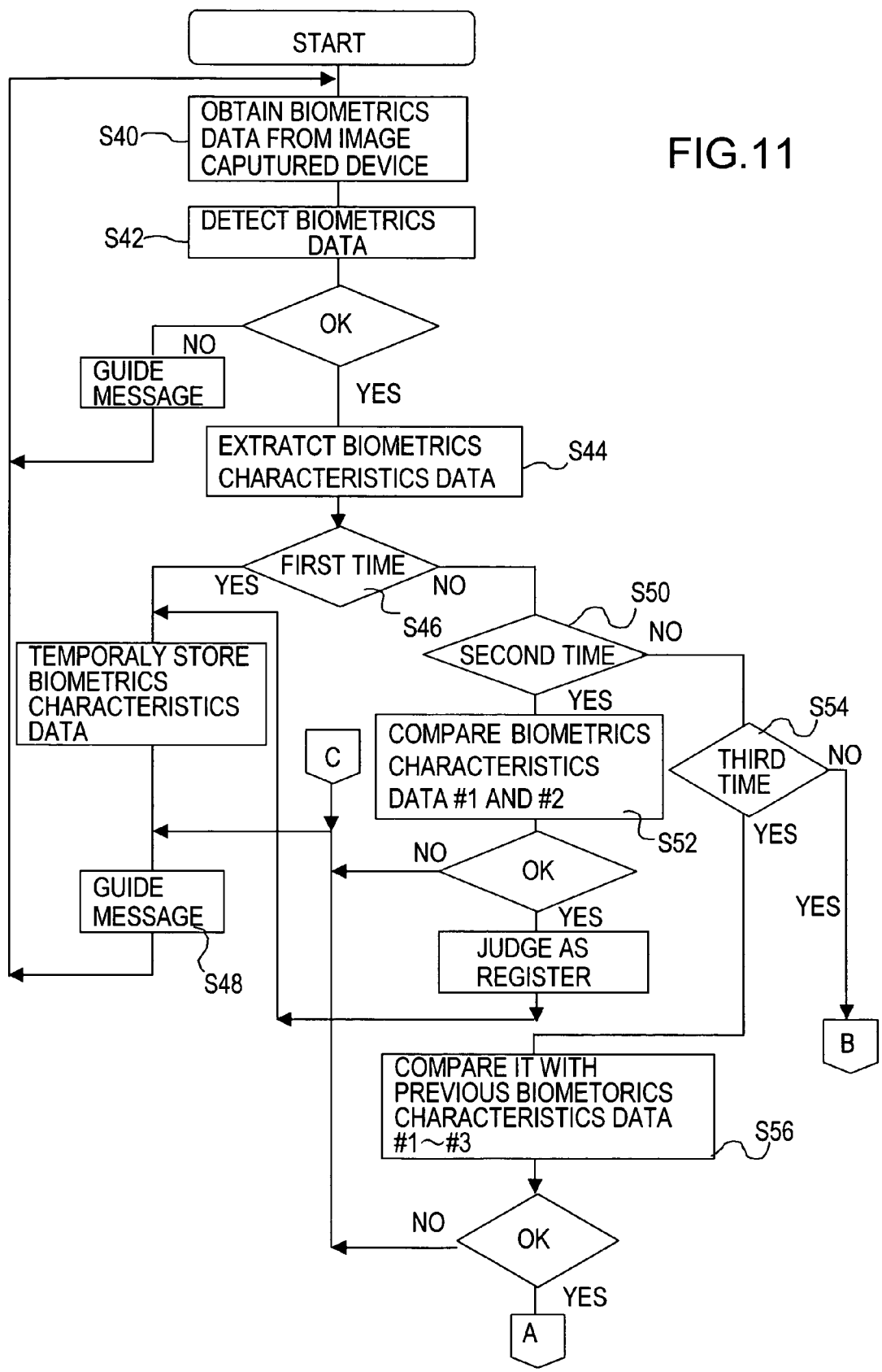
FIG. 11 is a first diagram of the flow of registration processing in FIG. 3.
Figure 12:
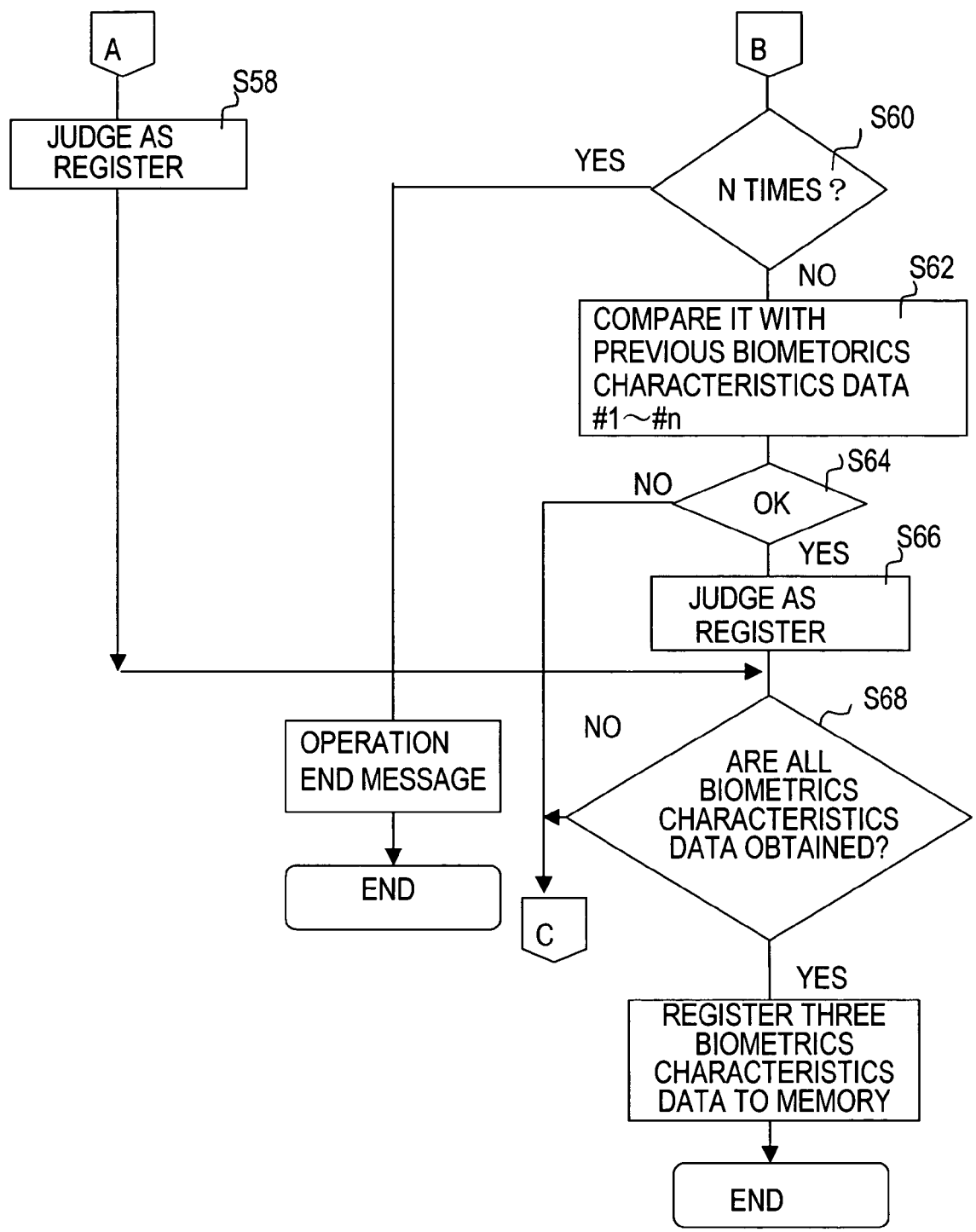
FIG. 12 is a second diagram of the flow of registration processing in FIG. 3.
Figure 13:
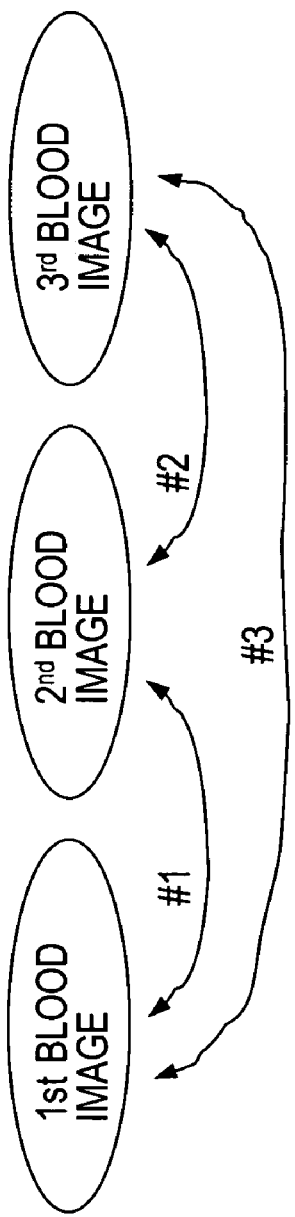
FIG. 13 explains the comparison of three blood vessel image data sets in FIG. 11.
Figure 14:
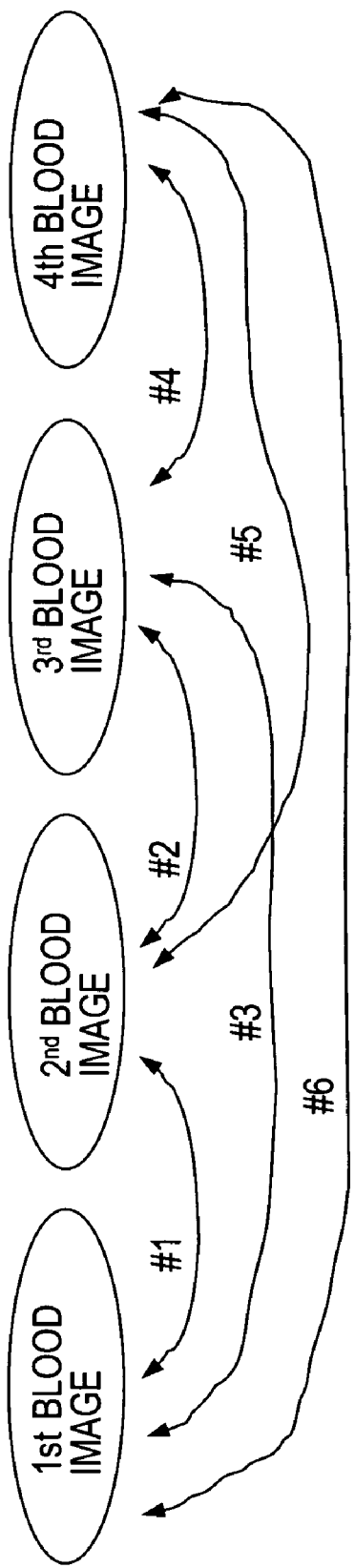
FIG. 14 explains the comparison of four blood vessel image data sets in FIG. 12.

FIG. 11 and FIG. 12 explain the flow of biometrics characteristic data registration processing in the invention, and FIG. 13 and FIG. 14 explain this processing. The flow of processing in FIG. 11 and FIG. 12 is explained in further detail, referring to FIG. 13 and FIG. 14.

(S40) As explained above, near-infrared light is emitted from the image capture device 1, to obtain an image of the palm of the hand (also called biometrics information).

(S42) As explained above, by means of the hand outline detection processing 30 explained in FIG. 9, the outline of the hand is detected from an image captured by the image capture device 1, and from the outline a judgment is made as to whether the image can be used in registration and verification processing. When the palm of the hand does not appear adequately in the image or in similar cases, a NG judgment is made, a message to provide guidance of the palm of the hand to the left or right, or forward or backward, is output to the display of the terminal device 3 by the guidance message output processing 32 described above, and processing returns to step S40.

(S44) When hand outline detection processing 30 judges that image capture with the hand extended correctly, blood vessel image extraction processing 34 extracts a vein image from the image of the hand.

(S46) A judgment is made as to whether the extraction is the first extraction. If the first extraction, the first blood vessel image is held temporarily.

(S48) Next, a guidance message urging repeated operation is output to the display of the terminal device 3, and processing returns to step S40.

(S50) On the other hand, if in step S46 the extraction is not the first extraction, but is judged to be the second or a subsequent extraction, a judgment is made as to whether the extraction is the second extraction.

(S52) If the extraction is the second extraction, the first blood vessel image data set is compared with the second blood vessel image data set, and the degree of similarity is calculated. The degree of similarity is a quantity indicating the extent of coincidence of the two blood vessel image patterns; various pattern matching techniques can be applied. For example, in the two grayscale representation pixel matrices for blood vessel image patterns in FIG. 7, the pixel values (grayscale values) for a pixel of interest in the two patterns are obtained and compared. If the two coincide, a degree of similarity counter is incremented by "1". The pixel of interest is moved, and pixel values are similarly compared to judge coincidence or non-coincidence. If the two coincide, the degree of similarity counter is incremented by "1". This is performed for all the pixels in the pixel matrices, and the value of the degree of similarity counter is taken to be the degree of similarity. If the degree of similarity is equal to or greater than a threshold determined in advance, the two are judged to be similar (OK), the second blood vessel image data set is judged to be registered, the second blood vessel image in step S46 is temporarily held, and processing proceeds to step S48. If on the other hand the degree of similarity does not exceed the threshold, the two are judged to be not similar (NG). Processing then proceeds to the repeated operation guidance message output of step S48.

(S54) If on the other hand in step S50 the extraction is not the second, but is the third or a subsequent extraction, a judgment is made as to whether the extraction is the third extraction. If not the third extraction, processing proceeds to step S60 of FIG. 12.

(S56) On the other hand, if the extraction is the third extraction, then the degrees of similarity between the blood vessel image data extracted thus far (here, the first and second sets) and the third blood vessel image data set are similarly calculated. That is, as shown in FIG. 13, in step S42 the degree of similarity #1 between the second blood vessel image data set and the first blood vessel image data set is calculated. In step S56, the degree of similarity #3 between the third blood vessel image data set and the first blood vessel image data set, and the degree of similarity #2 between the third blood vessel image data set and the second blood vessel image data set, are calculated, and judgments made. If, as a result of these comparisons, all the degrees of similarity #1, #2 and #3 are equal to or greater than the threshold, then all three are judged to be similar blood vessel images. Processing then proceeds to step S58 in FIG. 12. If on the other hand the comparisons of FIG. 13 indicate that any one among the degrees of similarity #1, #2, #3 does not exceed the threshold, processing returns to step S48.

(S58) The third blood vessel image data set is judged to be registered. Processing then proceeds to step S68.

(S60) If in step S54 the extraction is not the third extraction, then a judgment is made as to whether the extraction is the limiting Nth extraction. If the limiting Nth extraction, the operator is shown an operation ended message on the display, and processing ends.

(S62) If not the limiting Nth extraction, then comparisons with the n blood vessel image data sets obtained thus far are performed. For example, if the extraction is the fourth extraction, then as shown in FIG. 14, the degree of similarity #6 between the fourth blood vessel image data set and the first blood vessel image data set, the degree of similarity #5 between the fourth blood vessel image data set and the second blood vessel image data set, and the degree of similarity #4 between the fourth blood vessel image data set and the third blood vessel image data set, are calculated, and judgments made.

(S64) If all of the degrees of similarity #4, #5, #6 are equal to or greater than the threshold, the three blood vessel images with higher degrees of similarity among the first, fourth, second and third sets are judged to be similar, and processing proceeds to step S66. If on the other hand, in the comparisons of FIG. 14, any one among the degrees of similarity #4, #5, #6 is judged not to exceed the threshold, processing returns to step S48 in FIG. 11, and fifth and subsequent images are captured, blood vessel image extraction is performed, and degree of similarity calculations and judgments are similarly performed.

(S66) A judgment is made as to whether the nth blood vessel image data set is registered.

(S68) A judgment is then made as to whether three blood vessel image data sets which are similar and can be registered have been obtained. If not obtained, processing returns to step S48. If obtained, the three blood vessel image data sets are registered in the storage portion 4*a*, together with a user ID (account number or similar). That is, as shown in FIG. 8, an individual ID and three blood vessel image data sets (here, series of black-and-white binary data values) are registered in the storage portion 4*a* as the registered blood vessel image data of the storage portion 4*a*.

As indicated in step S60, when some phenomenon incompatible with registration occurs continuously, the burden on the operator is increased, and so a number N may be freely set, and when this number is reached a message is output instructing the user either to repeat operations from the beginning, or to consult with a teller.

In this way, blood vessel image data is detected a plurality of times, and a plurality (here, three) of blood vessel image data sets with high degree of similarity are registered as the optimum blood vessel image data. Consequently even if there are differences in the biometrics data due to the image capture device, to changes in physical condition, or to the manner of extension of the hand or other aspects of the state of image capture, because image capture is performed a plurality of times and only optimal biometrics information with a high degree of similarity suitable for registration is registered, a plurality of sets of biometrics information can be registered which reflect differences, without lowering the accuracy of verification. If the person performing registration (the user) were obligated to perform dozens of registration operations, the burden on the user would be excessive, and so the number of operations is limited to the number likely to be acceptable to users, and the optimal registration information is obtained from this information and is registered in the storage portion.

Here, the initial blood vessel image data is used as reference in performing registration. Of the second and subsequent blood vessel image patterns, two blood vessel image data sets with a high degree of similarity are registered. Because the initial data is used as reference, indefinite continuation of degree of similarity calculations and judgments can be prevented.

Trial Authentication and Authentication Processing

Next, trial authentication is explained. As stated above, when registration of n (in the above explanation, 3) data sets is completed, operation to confirm the verification process is immediately executed. As a result, the user practices the manner of extending the hand during the next verification, and can confirm that reliable authentication using the palm of his hand is possible. As a result, the sense of security and reliability of the system on the part of the user is increased. The trial authentication is performed using the same procedure as in actual authentication. Hence the trial authentication is actual authentication processing as well. Below, the processing is explained using FIG. 15 through FIG. 17.

Figure 15:
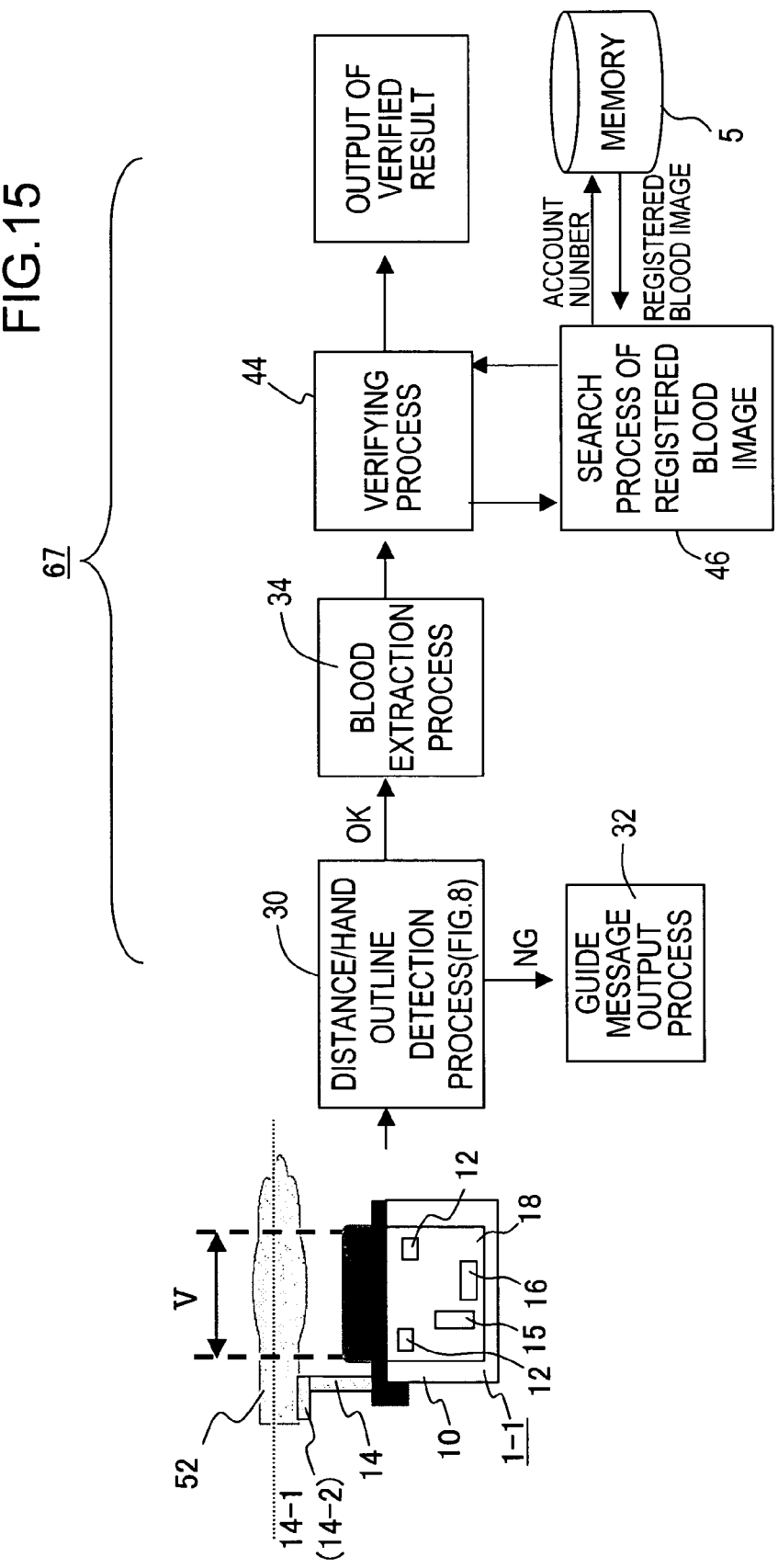
FIG. 15 is a functional block diagram of trial authentication processing in another embodiment of the invention.
Figure 16:
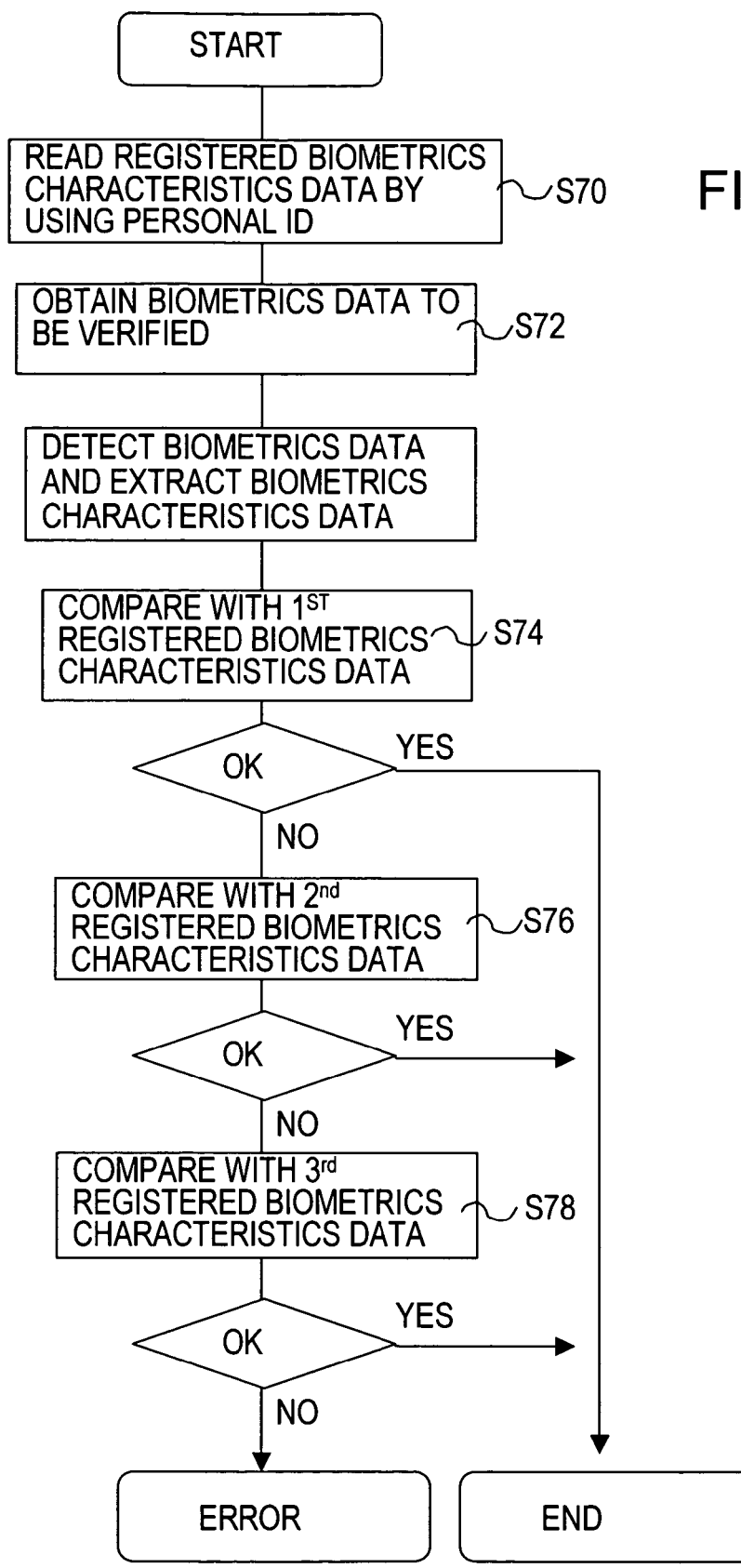
FIG. 16 shows the flow of the trial authentication processing in FIG. 15.
Figure 17:
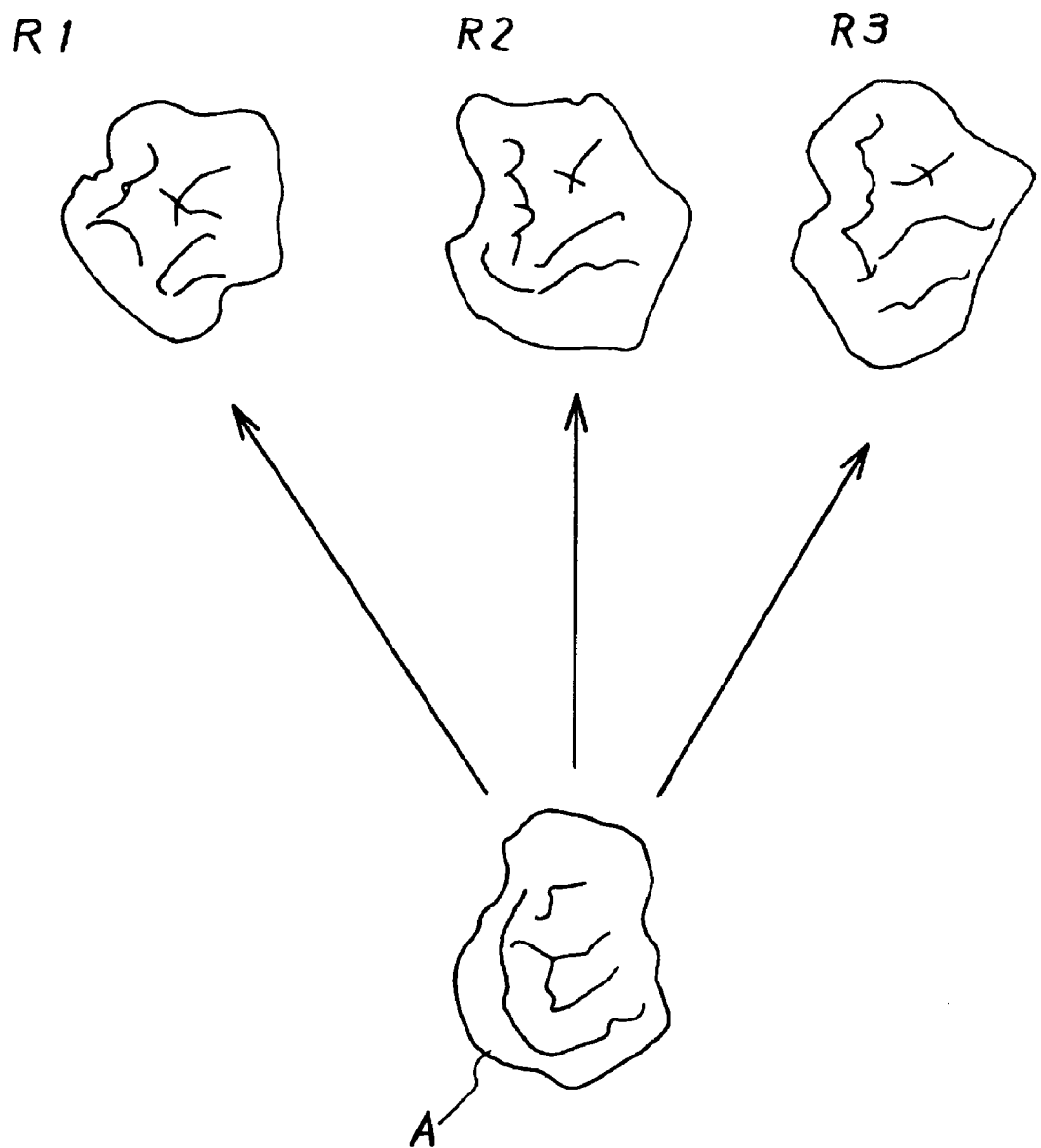
FIG. 17 explains the verification processing of FIG. 15.

FIG. 15 is a functional block diagram of authentication processing in one aspect of the invention, FIG. 16 shows the flow of authentication processing in FIG. 15, and FIG. 17 explains the operation therein.

In FIG. 15, portions which are the same as in FIG. 2 and FIG. 4 are denoted by the same symbols. That is, the CPU of the terminal device 3 connected to the image capture device 1 executes the series of authentication processing 30 to 46.

As explained above using FIG. 9, hand outline detection processing 30 detects the outline of the hand from an image captured by the image capture device 1, and from the outline judges whether the image can be used in registration and verification processing. For example, the palm of the hand may or may not appear adequately in the image. Guidance message output processing 32 outputs to the display of the terminal device 3 a message to guide the palm of the hand leftward, rightward, forward or backward when the image cannot be used in registration and verification processing. By this means, the user at the terminal device 3 is guided in extending the user's hand over the image capture device 1.

Figure 19:
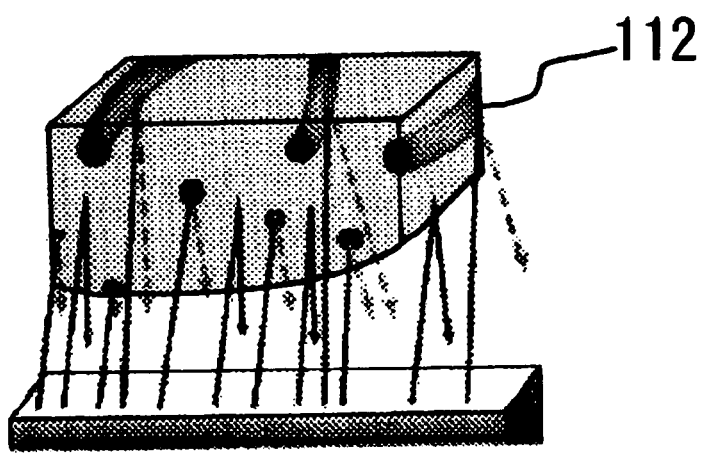
FIG. 19 explains the principle of a conventional palm image capture device.

When hand outline detection processing 30 judges to be successfully captured an image with the hand extended correctly, blood image extraction processing 34 extract a vein image from the image of the hand. That is, as explained using FIG. 18 and FIG. 19, grayscale data of the image of the palm of the hand is obtained from differences in reflectivity, as in FIG. 6.

As shown in FIG. 8, registered blood vessel image search processing 46 searches the storage portion 4a for three registered blood vessel image data sets R1, R2, R3 corresponding to the individual ID (account number). As shown in FIG. 17, verification processing 44 compares the blood vessel image data A detected by the blood vessel image detection processing 34 with the three registered blood vessel image data sets R1, R2, R3, performs verification processing, and outputs a verification result.

A more detailed explanation is given using FIG. 16.

(S70) The ID (account number) presented by the user is employed to read the three corresponding registered blood vessel image data sets R1, R2, R3 in the storage portion 4a.

(S72) Near-infrared light is emitted from the image capture device 1 to obtain an image of the palm of a hand. Hand outline detection processing 30 is performed to detect the outline of the hand from the image captured by the image capture device 1, and the outline is used to judge whether the image can be used in verification processing. If the palm image is not sufficiently present or other problems occur, an NG judgment is returned, and the above-described guidance message output processing 32 is performed to output to the display of the terminal device 3 a message guiding the palm of the hand leftward, rightward, forward or backward. When hand outline detection processing 30 judges that an image has been captured with the hand extended correctly, blood vessel image extraction processing 34 extracts a vein image from the image of the hand.

(S74) The first registered blood vessel image data set R1 and the extracted blood vessel image data A are compared, and the degree of similarity calculated. The degree of similarity is a quantity indicating the extent of coincidence of the two blood vessel image patterns; various pattern matching techniques can be applied. If the degree of similarity is equal to or greater than a threshold determined in advance, the two are judged to be similar (OK), authentication is successful, and processing ends.

(S76) On the other hand, if in step S74 the degree of similarity does not exceed the threshold, a judgment of non-similarity (NG) is returned. The second registered blood vessel image data set R2 is then compared with the extracted blood vessel image data A, and the degree of similarity is calculated. If the degree of similarity is equal to or greater than a threshold determined in advance, the two are judged to be similar (OK), authentication is successful, and processing ends.

(S78) On the other hand, if in step S76 the degree of similarity does not exceed the threshold, a judgment of non-similarity (NG) is returned. The third registered blood vessel image data set R3 is then compared with the extracted blood vessel image data A, and the degree of similarity is calculated. If the degree of similarity is equal to or greater than a threshold determined in advance, the two are judged to be similar (OK), authentication is successful, and processing ends. If however the degree is not exceeded over the threshold, a judgment of non-similarity (NG) is returned, and processing ends with an error.

In this trial authentication, as shown in FIG. 15, if the verification processing is not satisfactory, the image capture device 1 can be instructed to capture the next image. Hence the user is provided with more opportunities for trial authentication, and can become accustomed to the authentication method, contributing to the widespread adoption of the authentication equipment. This authentication processing is similar to actual authentication processing, and because an explanation would be redundant, details of the actual authentication processing are omitted.

OTHER EMBODIMENTS

In the above embodiment, biometrics authentication was explained for the case of authentication using the vein pattern in the palm of a hand; but application to other biometrics authentication employing palm-prints or other features of the hand is possible. Also, the explanation assumed financial operations, but application to any task requiring individual authentication is possible.

Further, calculation of degrees of similarity was explained using bitmap pattern matching techniques; but well-known methods in which data is vectorized, and the directions and lengths of vectors are used to calculate degrees of similarity, may also be employed. Also, the number of registrations is not limited to three, but may be any number greater than one. Verification (authentication) processing is performed by the same method as in FIG. 15 through FIG. 17, and is executed by the service area terminal 8 or ATM 6 of FIG. 1.

In the above, embodiments of the invention have been explained; but the invention can be variously modified within the scope of the invention, and these modifications are not excluded from the scope of the invention.

Because images of the palm of a hand of the same body are captured a plurality of times by an image capture unit, degrees of similarity between characteristic data sets of the plurality of images of the palm of the hand are calculated, and a plurality of characteristic data sets with a high degree of similarity are registered in a storage unit, even when using characteristic data detected a plurality of times, verification can be performed which accommodates changes in biometrics state without lowering the verification accuracy, and troubles with the user can be prevented, contributing to the widespread adoption of the biometrics authentication system. Further, because the shape of the hand in an image can be checked using outlines in the image of the palm of the hand, the success of the image capture can be judged rapidly and characteristic data can be extracted, so that registration processing can be executed in a short length of time.

What is claimed is:

1. A biometrics authentication system for performing individual authentication comprising:
    an image capture unit which captures images of a hand;
    a storage unit which stores plural registered characteristic data of a palm of the hand; and
    a processing unit which extracts outlines of borders of the palm and a portion of fingers of said hand from captured said image of said hand, judges from detected position of said extracted outlines in a capture range of the image capture unit and a number of said extracted outlines whether a capture of said image has been successful, wherein a successful capture is obtained by correctly holding the hand over the capture range, extracts a blood image characteristic data as said characteristic data from an image of the palm of said hand which is judged to have been captured successfully, and registers said blood image characteristic data in said storage unit,
    wherein said processing unit obtains said image of the hand a plurality of times from said image capture unit, judges degrees of similarity among said blood image characteristic data for each of said plurality of images of the hand, and registers in said storage unit a plurality of said blood image characteristic data with a high degree of similarity.

2. The biometrics authentication system according to claim 1, wherein said processing unit obtains images of the hand from said image capture unit, until a prescribed number of blood image characteristic data with a high degree of similarity are obtained.

3. The biometrics authentication system according to claim 1, wherein said processing unit, after registering said plurality of blood image characteristic data with a high degree of similarity in said storage unit, obtains from said image capture unit an image of said hand, extracts said blood image characteristic data, verifies said blood image characteristic data against said plurality of blood image characteristic data registered in said storage unit, and performs trial authentication.

4. The biometrics authentication system according to claim 1, wherein said processing unit extracts the outlines from an image of said hand captured by said image capture unit, judges whether said image capture has been successful from said extracted outlines, extracts said blood image characteristic data from said image of the hand judged to have been captured successfully, verifies said blood image characteristic data against said plurality of blood image characteristic data registered in said storage unit, and performs individual authentication.

5. The biometrics authentication system according to claim 4, wherein, at the time of individual authentication, said processing unit reads said plurality of blood image characteristic data from said storage unit according to identification information for an individual, and verifies said blood image characteristic data obtained from said image of the hand obtained from said image capture unit against said read plurality of blood image characteristic data.

6. The biometrics authentication system according to claim 5, wherein said processing unit detects a fact that said extracted blood image characteristic data is similar to one among said plurality of registered blood image characteristic data, and performs individual authentication.

7. The biometrics authentication system according to claim 5, wherein said image capture unit has a distance sensor which measures a distance between said image capture unit and the palm of said hand,
    and said processing unit obtains the image of the palm of said hand from said image capture unit when the distance measured by said distance sensor is within a prescribed range, and changes said prescribed range at a time of said registration and at a time of said individual authentication.

8. The biometrics authentication system according to claim 1, wherein said processing unit judges the degree of similarity to be high when said degree of similarity is equal to or greater than a prescribed threshold.

9. The biometrics authentication system according to claim 1, wherein said processing unit, upon judging that said image capture has not been successful from said outlines of said image of said hand, causes said image capture unit to again perform image capture of said hand, and obtains the image of said hand.

10. A non-transitory computer-readable medium encoded with a computer program, which causes a computer to execute the steps of:
    obtaining an image of a portion of a hand of a body from an image capture unit which captures the portion of the hand including a palm and a portion of fingers of the hand;
    extracting outlines of borders of the palm and a portion of fingers of said hand from the captured image of said hand;
    first judging, from a detected position of said extracted outlines in a capture range of the image capture unit and from a number of said extracted outlines within said image capture range whether a capture of said image has been successful, wherein a successful capture is obtained by correctly holding the hand over the capture range;

extracting blood image characteristic data from an image of the palm of the hand capture of which has been successful;

second judging degrees of similarity among a plurality of blood image characteristic data extracted from a plurality of said images; and registering a plurality of blood image characteristic data with a high degree of similarity in a storage unit.

11. The non-transitory computer-readable medium encoded with a computer program according to claim 10, further causing the computer to execute the steps of:

obtaining an image of the portion of the hand of a body from said image capture unit after registering a plurality of said blood image characteristic data with said high degree of similarity in said storage unit;

extracting the outlines of the image of the portion of said hand and judging, from positions of said extracted outlines within an image capture range of said image capture device and from a number of said outlines within said image capture range, whether said image capture has been successful, of extracting blood image characteristic data from said image capture of which has been successful; and verifying said blood image characteristic data against a plurality of blood image characteristic data registered in said storage unit for performing trial authentication.

12. A biometrics authentication system for performing individual authentication comprising:

an image capture unit which captures an image of a hand;

a storage unit which stores plural registered characteristic data of a palm of the hand; and a processing unit which extracts outlines of borders of the palm and a portion of fingers of said hand from captured said image of said hand, judges from detected position of said extracted outlines in a capture range of the image capture unit and the number of said extracted outlines whether a capture of said image has been successful, wherein a successful capture is obtained by correctly holding the hand over the capture range, wherein said processing unit, at a time of registration, obtains said image of the hand a plurality of times from said image capture unit, judges degrees of similarity among said characteristic data for each of said plurality of images of the hand, and registers in said storage unit a plurality of said characteristic data with a high degree of similarity, and said processing unit, at a time of individual authentication, said processing unit reads said plurality of characteristic data from said storage unit according to identification information for an individual, and verifies said characteristic data obtained from an image of the hand obtained from said image capture unit against said read plurality of characteristic data, and wherein said image capture unit has a distance sensor which measures a distance between said image capture unit and said hand, and said processing unit obtains the image of the palm of said hand from said image capture unit when the distance measured by said distance sensor is within a prescribed range, and changes said prescribed range at said time of said registration and at said time of said individual authentication.

13. A biometrics authentication system for performing individual authentication comprising:

an image capture unit which captures images of a hand;

a storage unit which stores plural registered characteristic data of a palm of the hand; and a processing unit which extracts outlines of borders of the palm and a portion of fingers of said hand from captured said image of said hand, judges from detected position of said extracted outlines in a capture range of the image capture unit and a number of said extracted outlines whether the hand is correctly held over the capture range, extracts characteristic data from an image of the palm of said hand which is judged to have been held correctly, and registers said characteristic data in said storage unit, wherein said processing unit obtains said image of the hand a plurality of times from said image capture unit, judges the degree of similarity of said characteristic data at second and subsequent obtain times with reference to said characteristic data at first obtain time and registers said plurality of characteristic data with a high degree of similarity with said characteristic data at the first obtain time and said characteristic data at the first obtain time.

* * * * *